(12) United States Patent
Arai

(10) Patent No.: US 10,713,167 B2
(45) Date of Patent: Jul. 14, 2020

(54) INFORMATION PROCESSING APPARATUS AND METHOD INCLUDING SIMULATING ACCESS TO CACHE MEMORY AND GENERATING PROFILE INFORMATION

(71) Applicant: FUJITSU LIMITED, Kawasaki-shi, Kanagawa (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/048,413

(22) Filed: Jul. 30, 2018

(65) Prior Publication Data
US 2019/0042426 A1    Feb. 7, 2019

(30) Foreign Application Priority Data

Aug. 3, 2017   (JP) ................. 2017-150665

(51) Int. Cl.
*G06F 12/08*    (2016.01)
*G06F 9/00*     (2006.01)
(Continued)

(52) U.S. Cl.
CPC ............ *G06F 12/0815* (2013.01); *G06F 8/40* (2013.01); *G06F 9/00* (2013.01); *G06F 12/0884* (2013.01);
(Continued)

(58) Field of Classification Search
CPC ............ G06F 12/0815; G06F 12/0884; G06F 2212/1008; G06F 9/00; G06F 9/455;
(Continued)

(56) References Cited

U.S. PATENT DOCUMENTS

| | | | | |
|---|---|---|---|---|
| 6,002,875 A | * | 12/1999 | Stolberg | G06F 12/0802 711/E12.017 |
| 2005/0086653 A1 | * | 4/2005 | Heishi | G06F 8/4442 717/151 |

(Continued)

FOREIGN PATENT DOCUMENTS

JP    2014-232369 A    12/2014

*Primary Examiner* — Glenn Gossage
(74) *Attorney, Agent, or Firm* — Fujitsu Patent Center

(57) ABSTRACT

An information processing apparatus includes a first memory and a processor coupled to the first memory. The processor is configured to acquire a first address in the first memory, at which an instruction included in a target program is stored. The processor is configured to simulate access to a second memory, such as a cache memory, corresponding to an access request for access to the first address on a basis of configuration information of the second memory. The processor is configured to generate first information, such as cache profile information, indicating whether the access to the second memory regarding the instruction is a hit or miss. The processor may be configured to acquire a number of cache misses for each of a plurality of pieces of arrangement information, and select a piece of arrangement information where the number of cache misses is smallest. Where the second memory is divided into a plurality of cache sets, the processor may generate the first information for each of the respective cache sets in parallel with each other. A cache set number of the second memory may also be identified.

18 Claims, 14 Drawing Sheets

(51) Int. Cl.
- *G06F 8/40* (2018.01)
- *G06F 12/0815* (2016.01)
- *G06F 12/0884* (2016.01)
- G06F 12/02 (2006.01)
- G06F 12/06 (2006.01)
- G06F 9/455 (2018.01)

(52) U.S. Cl.
CPC .............. *G06F 9/455* (2013.01); *G06F 12/02* (2013.01); *G06F 12/06* (2013.01); *G06F 2212/1008* (2013.01)

(58) Field of Classification Search
CPC ... G06F 8/00; G06F 8/40; G06F 12/02; G06F 12/06
See application file for complete search history.

(56) References Cited

U.S. PATENT DOCUMENTS

| | | | |
|---|---|---|---|
| 2006/0212440 A1* | 9/2006 | Heishi | G06F 8/4442 |
| 2009/0019266 A1* | 1/2009 | Maeda | G06F 9/30047 712/220 |
| 2013/0185475 A1* | 7/2013 | Talagala | G06F 12/0866 711/102 |
| 2014/0359214 A1 | 12/2014 | Arai | |
| 2015/0082284 A1* | 3/2015 | Badea | G06F 11/3471 717/128 |
| 2016/0170894 A1* | 6/2016 | Sugisaki | G06F 12/0893 711/125 |
| 2016/0253261 A1* | 9/2016 | Lee | G06F 30/33 711/141 |
| 2019/0369997 A1* | 12/2019 | Koyama | G06F 9/321 |

\* cited by examiner

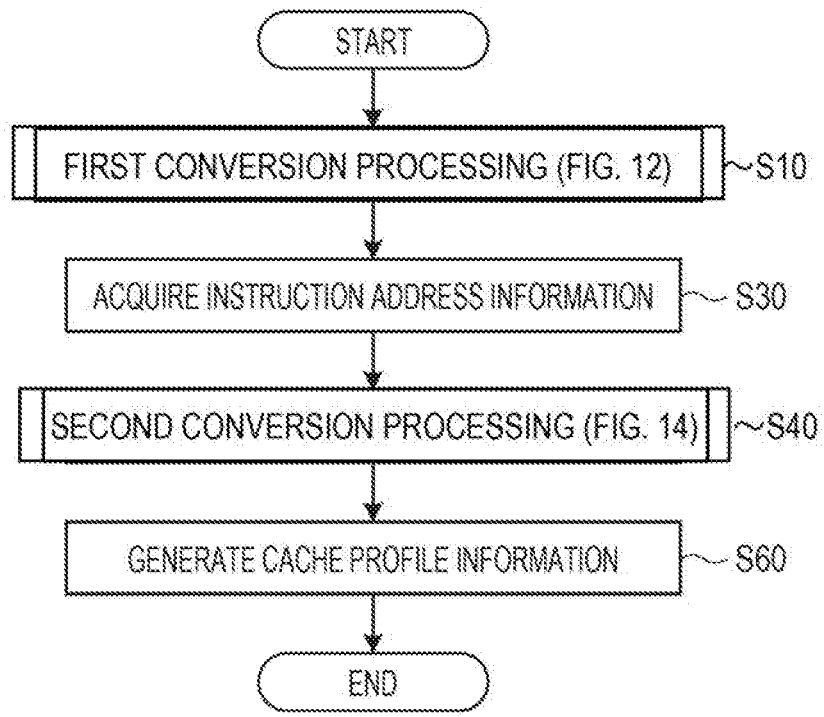

FIG. 5

```
AS: ;
   for (i = 0; i < NI; i++) {
AS1S: ;
S1:    end = NJ[i];
AS1E: ;
     for (j = 0; j < end; j++) {
AS2S: ;
S2:       Z[i][j] = X[i][j] + Y[i][j];
AS2E: ;
     }
   }
AE: ;
   printf ("0x%x\n", &&AS);
   printf ("0x%x\n", &&AS1S);
   printf ("0x%x\n", &&AS1E);
   printf ("0x%x\n", &&AS2S);
   printf ("0x%x\n", &&AS2E);
   printf ("0x%x\n", &&AE);
```

FIG. 6

| TYPE OF DATA | VALUE |
|---|---|
| START ADDRESS OF ARRAY NJ | 4000 |
| NUMBER OF BYTES PER ARRAY ELEMENT OF ARRAY NJ | 4 |
| DIMENSION INFORMATION OF ARRAY NJ | 6 |
| START ADDRESS OF ARRAY X | 0 |
| NUMBER OF BYTES PER ARRAY ELEMENT OF ARRAY X | 8 |
| DIMENSION INFORMATION OF ARRAY X | 6 × 6 |
| START ADDRESS OF ARRAY Y | 800 |
| NUMBER OF BYTES PER ARRAY ELEMENT OF ARRAY Y | 8 |
| DIMENSION INFORMATION OF ARRAY Y | 6 × 6 |
| START ADDRESS OF ARRAY Z | 1600 |
| NUMBER OF BYTES PER ARRAY ELEMENT OF ARRAY Z | 8 |
| DIMENSION INFORMATION OF ARRAY Z | 6 × 6 |

FIG. 7

| INDEX | DATA |
|---|---|
| 0 | 6 |
| 1 | 5 |
| 2 | 4 |
| 3 | 3 |
| 4 | 2 |
| 5 | 1 |

FIG. 8

| VARIABLE | DATA |
|----------|------|
| NI | 6 |

FIG. 9

| LABEL | ADDRESS VALUE |
|-------|---------------|
| AS | 0x400628 |
| AS1S | 0x400630 |
| AS1E | 0x40064c |
| AS2S | 0x400654 |
| AS2E | 0x4006e8 |
| AE | 0x400728 |

FIG. 10

```
    ACCESS (iaddress(AS));
    for (i = 0; i < NI; i++) {
S1:    end = NJ[i];
       ACCESS (iaddress(AS1S));
       ACCESS (address(NJ[i]));
       ACCESS (iaddress(AS1E));
       for (j = 0; j < end; j++) {
          ACCESS (iaddress(AS2S));
          ACCESS (address(X[i][j]));
          ACCESS (address(Y[i][j]));
          ACCESS (address(Z[i][j]));
          ACCESS (iaddress(AS2E));
       }
    }
    ACCESS (iaddress(AE));
    print_out_RESULT ();
```

FIG. 11

| TYPE OF DATA | VALUE |
|---|---|
| NUMBER A OF ASSOCIATIVE CACHES | 2 |
| BLOCK SIZE B OF CACHE | 32 |
| NUMBER S OF CACHE SETS | 4 |

FIG. 13

| NUMBER OF CONSTITUENT ELEMENT | CONSTITUENT ELEMENT |
|---|---|
| E1 | for (i = 0; i < NI; i++) { |
| E2 | S1: end = NJ[i]; |
| E3 | for (j = 0; j < end; j++) { |
| E4 | S2: Z[i][j] = X[i][j] + Y[i][j]; |
| E5 | } |
| E6 | } |

FIG. 16

| LABEL | OFFSET VALUE |
|---|---|
| AS | 0 |
| AS1S | 8 |
| AS1E | 36 |
| AS2S | 44 |
| AS2E | 192 |
| AE | 256 |

FIG. 17

```
   ACCESS (ASTART+ioffset(AS));
   for (i = 0; i < NI; i++) {
S1:  end = NJ[i];
     ACCESS (ASTART+ioffset(AS1S));
     ACCESS (DSTART(NJ)+offset(NJ[i]));
     ACCESS (ASTART+ioffset(AS1E));
     for (j = 0; j < end; j++) {
        ACCESS (ASTART+ioffset(AS2S));
        ACCESS (DSTART(X)+offset(X[i][j]));
        ACCESS (DSTART(Y)+offset(Y[i][j]));
        ACCESS (DSTART(Z)+offset(Z[i][j]));
        ACCESS (ASTART+ioffset(AS2E));
     }
   }
   ACCESS (ASTART+ioffset(AE));
   print_out_RESULT ();
```

FIG. 18

| DATA NAME | START ADDRESS VALUE | CHANGE OFFSET RANGE |
|---|---|---|
| ASTART | 0x8000 | [0, 256] |
| NJ | 0x0000 | [0, 256] |
| X | 0x1000 | [0, 256] |
| Y | 0x2000 | [0, 256] |
| Z | 0x3000 | [0, 256] |

FIG. 19

| DATA NAME | OFFSET VALUE |
|---|---|
| ASTART | 0 |
| NJ | 0 |
| X | 0 |
| Y | 0 |
| Z | 128 |

FIG. 20

```
   IACCESS (iaddress(AS);
   for (i = 0; i < NI; i++) {
S1:   end = NJ[i];
      IACCESS (iaddress(AS1S);
      ACCESS (address(NJ[i]);
      IACCESS (iaddress(AS1E);
      for (j = 0; j < end; j++) {
         IACCESS (iaddress(AS2S);
         ACCESS (address(X[i][j]);
         ACCESS (address(Y[i][j]);
         ACCESS (address(Z[i][j]);
         IACCESS (iaddress(AS2E);
      }
   }
   IACCESS (iaddress(AE);
   print_out_RESULT ();
```

INFORMATION PROCESSING APPARATUS AND METHOD INCLUDING SIMULATING ACCESS TO CACHE MEMORY AND GENERATING PROFILE INFORMATION

CROSS-REFERENCE TO RELATED APPLICATION

This application is based upon and claims the benefit of priority of prior Japanese Patent Application No. 2017-150665, filed on Aug. 3, 2017, the entire contents of which are incorporated herein by reference.

FIELD

The embodiments discussed herein are related to an information processing apparatus and an information processing method.

BACKGROUND

There has hitherto been a technique of acquiring profile information about access to a cache memory during execution of a program.

For example, there is proposed a technique of acquiring profile data for each cache set of a cache memory. In this technique, a cache set number corresponding to an address of an array X is obtained, and it is determined whether or not the cache set number is a set number s in charge of a profile data acquisition process. In the case where the cache set number is the set number s in charge of the profile data acquisition process, it is determined whether or not tag information corresponding to the address of the array X is stored in a storage unit. In the case where the tag information corresponding to the address of the array X is stored in the storage unit, a hit variable is incremented by one. In the case where the tag information is not stored in the storage unit, a miss variable is incremented by one.

In a high-performance computing (HPC) application program or the like, a hot spot of the program tends to be limited. Thus, in the case where profile data is acquired in order to grasp the characteristics of the program, it is often sufficient to investigate only several loops (kernel loops). In general, the loops of an HPC application access a large amount of data, and therefore it is desirable to effectively utilize a cache memory of a central processing unit (CPU) in order to execute the loops at a high speed.

The cache memory stores data such as the values of variables and array elements to be accessed during execution of a program. Instructions constituting a program are themselves also data, and therefore are stored in the cache memory. In the case where an instruction to be executed is not present in the cache memory during execution of the program, the CPU is not able to continue execution of the program until the relevant instruction is acquired from a main memory. Thus, a cache miss of an instruction is a factor of a reduction in performance that is more serious than a cache miss of data. In particular, the same instruction is repeatedly executed in a loop program, and therefore it is desirable to effectively utilize the cache memory also for instructions. Thus, it is an important technique to acquire cache profile information of the instructions.

Related techniques are disclosed in, for example, Japanese Laid-open Patent Publication No. 2014-232369.

The currently available method of investigating the usage situation of a cache utilizes a register built in the CPU, and enables acquiring simple information such as a count of the number of cache misses. However, the method which utilizes the register built in the CPU does not allow acquiring detailed cache profile information in consideration of caching of the instructions. It is also conceivable to use a method of acquiring detailed profile information using a CPU simulator or a dedicated tool. In this case, however, it takes an execution time that is much longer than that for normal execution of the program. Since execution of a large-scale HPC application program generally takes a long time, it is not practical to utilize the actual device for a long time in order to acquire profile information on the usage situation of the cache memory.

SUMMARY

According to an aspect of the present invention, an information processing apparatus includes a first memory and a processor coupled to the first memory. The processor is configured to acquire a first address in the first memory, at which an instruction included in a target program is stored. The processor is configured to simulate access to a second memory corresponding to an access request for access to the first address on a basis of configuration information of the second memory. The processor is configured to generate first information relating to the access to the second memory regarding the instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating an example of information processing when information about a target program is input to the information processing apparatus to start cache profiling, according to a first embodiment;

FIG. 4 is a diagram illustrating an example of program information of a target program;

FIG. 5 is a diagram illustrating an example of an instruction address information acquisition program;

FIG. 6 is a diagram illustrating an example of program data information;

FIG. 7 is a diagram illustrating an example of array data information;

FIG. 8 is a diagram illustrating an example of variable data information;

FIG. 9 is a diagram illustrating an example of instruction address information;

FIG. 10 is a diagram illustrating an example of a profile information generation program;

FIG. 11 is a diagram illustrating an example of cache configuration information;

FIG. 13 is a diagram illustrating an example of a target program decomposed into constituent elements;

FIG. 16 is a diagram illustrating an example of instruction address information for optimization;

FIG. 17 is a diagram illustrating an example of a profile information generation program for optimization;

FIG. 18 is a diagram illustrating an example of arrangement attempt information;

FIG. 19 is a diagram illustrating an example of arrangement information; and

FIG. 20 is a diagram illustrating an example of a profile information generation program corresponding to the Harvard architecture.

DESCRIPTION OF EMBODIMENTS

The embodiments disclosed herein will be described in detail below with reference to the drawings. In the embodiments described below, the von Neumann architecture, in which data that indicates instructions (hereinafter referred to simply as "instructions") and data such as the values of variables and array elements (hereinafter referred to simply as "data") are stored in the same cache memory, is adopted.

First Embodiment

Figure 1:
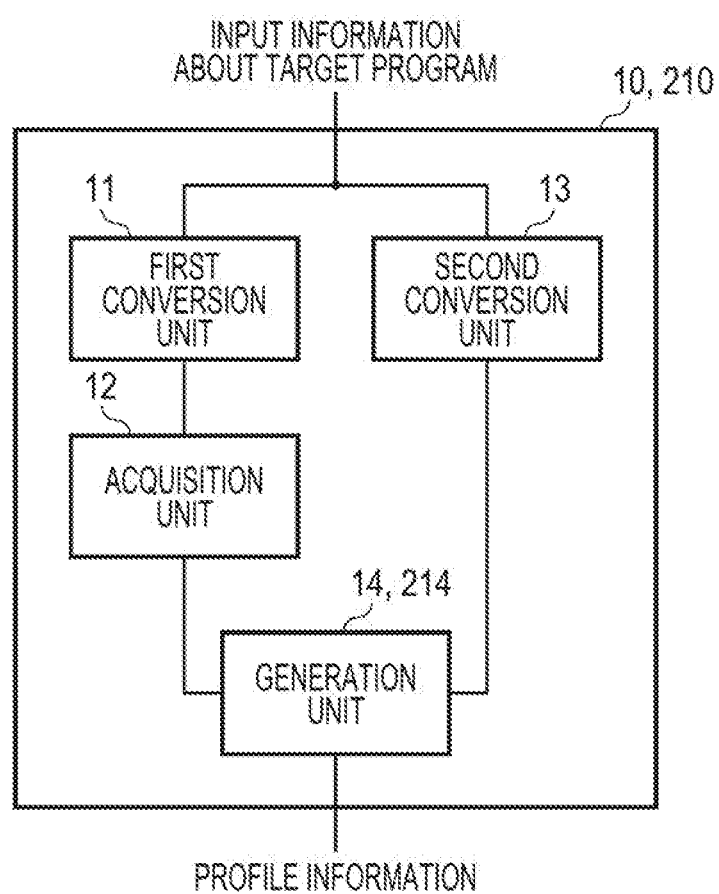
FIG. 1 is a diagram illustrating an exemplary functional configuration of an information processing apparatus according to first and second embodiments.

As illustrated in FIG. 1, input information about a target program to be profiled is input to an information processing apparatus 10 according to a first embodiment. The input information includes program information (source file) of the target program, program data information, array data information, variable data information, and cache configuration information. The information included in the input information will be discussed in detail later.

The information processing apparatus 10 simulates access to a cache memory for a case where the target program is executed, and generates and outputs profile information (hereinafter referred to as "cache profile information") about the access to the cache memory. In the first embodiment, the number of cache misses is output as the cache profile information. A cache miss refers to an occasion in which an instruction or data stored in a memory area of a memory (main memory) to be accessed by a program is not present in a cache memory.

As illustrated in FIG. 1, the information processing apparatus 10 functionally includes a first conversion unit 11, an acquisition unit 12, a second conversion unit 13, and a generation unit 14. The first conversion unit 11 and the acquisition unit 12 are an example of an acquisition unit according to the disclosure. The second conversion unit 13 and the generation unit 14 are an example of a generation unit according to the disclosure.

The first conversion unit 11 converts the program information of the target program, which is included in the input information, into a source file of an instruction address information acquisition program. The instruction address information acquisition program is a program for generating information (hereinafter referred to as "instruction address information") on an address value of a memory to be accessed when a central processing unit (CPU) executes an instruction in the target program.

The acquisition unit 12 acquires the instruction address information by executing the instruction address information acquisition program, which is obtained by the conversion performed by the first conversion unit 11, using the program data information, the array data information, and the variable data information which are included in the input information.

The second conversion unit 13 converts the program information of the target program, which is included in the input information, into a source file of a profile information generation program. The profile information generation program is a program for generating profile information on access to a cache memory corresponding to an access request for access to a memory that stores data and instructions in the target program.

The generation unit 14 executes the profile information generation program, which is obtained by the conversion performed by the second conversion unit 13, using the program data information, the array data information, the variable data information, and the cache configuration information which are included in the input information. The generation unit 14 generates cache profile information by simulating access to a cache memory corresponding to an access request for access to a memory that stores data and instructions in the target program by executing the profile information generation program. The generation unit 14 outputs the generated cache profile information.

Figure 2:
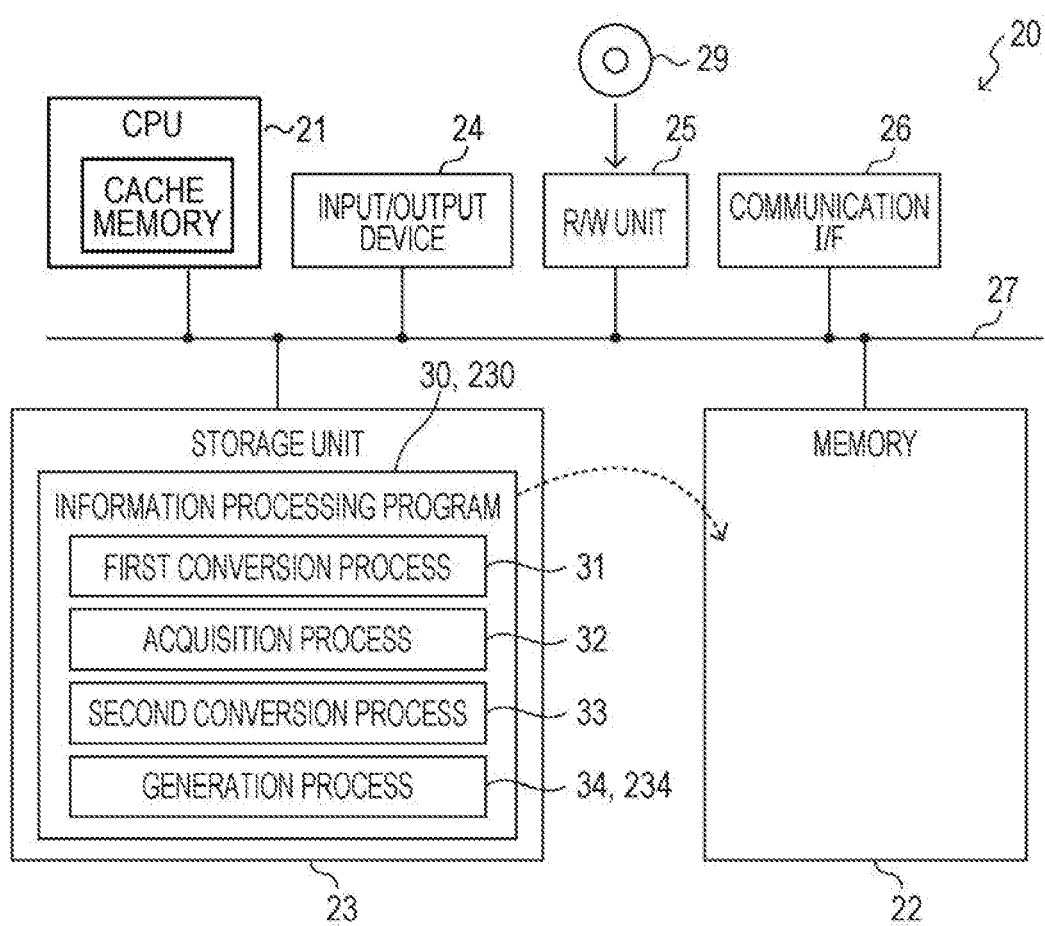
FIG. 2 is a diagram illustrating an exemplary hardware configuration of a computer that functions as an information processing apparatus according to first and second embodiments.

The information processing apparatus 10 may be implemented by a computer 20 illustrated in FIG. 2, for example. The computer 20 includes a CPU 21, a memory 22 as a temporary storage area, and a non-volatile storage unit 23. The computer 20 also includes an input/output device 24 that includes a display unit and an input unit, and a read/write (R/W) unit 25 that controls reading and writing of data from and into a storage medium 29. The computer 20 further includes a communication interface (I/F) 26 coupled to a network such as the Internet. The CPU 21, the memory 22, the storage unit 23, the input/output device 24, the read/write unit 25, and the communication interface 26 are coupled to each other via a bus 27. The CPU 21 is a hardware component.

The storage unit 23 may be implemented by a hard disk drive (HDD), a solid state drive (SSD), a flash memory, or the like. The storage unit 23 as a storage medium stores an information processing program 30 for causing the computer 20 to function as the information processing apparatus 10 of FIG. 1. The information processing program 30 has a first conversion process 31, an acquisition process 32, a second conversion process 33, and a generation process 34.

The CPU 21 reads the information processing program 30 from the storage unit 23 to load the information processing program 30 in the memory 22, and sequentially executes the processes of the information processing program 30. The CPU 21 operates as the first conversion unit 11 illustrated in FIG. 1 by executing the first conversion process 31. The CPU 21 operates as the acquisition unit 12 illustrated in FIG. 1 by executing the acquisition process 32. The CPU 21 operates as the second conversion unit 13 illustrated in FIG. 1 by executing the second conversion process 33. The CPU 21 operates as the generation unit 14 illustrated in FIG. 1 by executing the generation process 34. Consequently, the computer 20 of FIG. 2 which executes the information processing program 30 functions as the information processing apparatus 10 of FIG. 1.

The functions which are implemented by the information processing program 30 may also be implemented by a semiconductor integrated circuit, more specifically an application specific integrated circuit (ASIC) or the like, for example.

Next, operations of the information processing apparatus 10 according to the first embodiment will be described. When input information about the target program is input to the information processing apparatus 10 to instruct the information processing apparatus 10 to start the profiling, the information processing apparatus 10 executes information processing illustrated in FIG. 3.

In an HPC application program, for example, a hot spot of the program tends to be limited. Thus, in the case where profile information is acquired in order to grasp the characteristics of the program, it is often sufficient to investigate only several loops. Thus, in the first embodiment, a part including loop processing, of the entire program related to certain business processing, is determined as the target program, and input information about the target program is input to the information processing apparatus 10. FIG. 4 illustrates an example of program information of the target program, which is input to the information processing apparatus 10.

In S10 of FIG. 3, first conversion processing to be discussed in detail later is executed so that program information of the target program, such as that illustrated in FIG. 4, is converted into a source file of an instruction address information acquisition program, such as that illustrated in FIG. 5, for example.

Next, in S30, the acquisition unit 12 executes the instruction address information acquisition program, which is obtained by the conversion performed by the first conversion unit 11, using program data information illustrated in FIG. 6, array data information illustrated in FIG. 7, and variable data information illustrated in FIG. 8, for example. The program data information illustrated in FIG. 6 includes a start address of each array (NJ, X, Y, Z) to be referenced by the target program, the number of bytes per array element, and dimensional information. The array data information illustrated in FIG. 7 is information obtained by correlating the value (data) of each element of an array NJ to be referenced by the target program illustrated in FIG. 4 with an index. The variable data information illustrated in FIG. 8 is information that indicates the value (data) of a variable NI that indicates the number of repetitions of a loop in the target program.

The acquisition unit 12 executes the instruction address information acquisition program illustrated in FIG. 5, and acquires instruction address information, such as that illustrated in FIG. 9, for example. In the instruction address information illustrated in FIG. 9, a label (to be discussed in detail later) added at a position of an instruction in the target program, and an address value of the memory to be accessed by the program at the position of the label, are correlated with each other. The method of acquiring the address value corresponding to the position of the label may be implemented, for example, utilizing an operator for acquiring an address value corresponding to a label. In the case where the program is written in the C language, the operator && included in the extended functions of GNU C compiler may be utilized.

Referring again to FIG. 3, next, in S40, second conversion processing to be discussed in detail later is executed so that program information of the target program, such as that illustrated in FIG. 4, is converted into a source file of a profile information generation program, such as that illustrated in FIG. 10, for example.

Next, in S60, the generation unit 14 executes the profile information generation program which is obtained by the conversion performed in S40. The generation unit 14 executes the profile information generation program using the program data information, the array data information, the variable data information, and the cache configuration information, which are included in the input information, and the instruction address information, which is acquired in S30. Consequently, the generation unit 14 generates cache profile information by simulating access to a cache memory corresponding to an access request for access to a memory that stores data and instructions in the target program. The generation unit 14 outputs the generated cache profile information. Thereafter, the information processing is ended.

A function address(D) invoked by a library function ACCESS included in the profile information generation program illustrated in FIG. 10 is a function that acquires an address value of an array element D during execution of the program. The address(D) may be implemented by identifying the relevant address value with reference to the program data information illustrated in FIG. 6. For example, the address of NJ[i] may be identified as 4000+i×4 based on the start address 4000 of the array NJ, the number 4 of bytes per array element, and a variable i. In the case where the program is written in the C language, for example, the address(D) may be implemented utilizing an operator &.

A function iaddress(I) invoked by the library function ACCESS included in the profile information generation program illustrated in FIG. 10 is a function that acquires an address value of a label I in the program. The iaddress(I) may be implemented by acquiring an address value correlated with the label I of the instruction address information (e.g. FIG. 9) which is acquired by the acquisition unit 12.

A library function ACCESS (a) included in the profile information generation program illustrated in FIG. 10 receives an address value which is acquired by the address (D) or the iaddress(I) as an argument a. The library function ACCESS (a) simulates access to a cache memory corresponding to access to the address a of the memory based on the cache configuration information which is included in the input information.

Specifically, the library function ACCESS (a) identifies a cache set number of a cache memory corresponding to an address value a. The cache set number s corresponding to the address value a is identified as follows using cache configuration information including information such as the number A of associative caches, the block size B, and the number S of cache sets, such as that indicated in FIG. 11, for example.

$$s=(a/B \text{ (with fractions rounded down))mod } S$$

It is determined whether or not a cache set indicated by the identified cache set number s stores data (or an instruction) to which the program requests access. In the case where the relevant data is not stored in the cache memory, it is determined to be a cache miss. The technique disclosed in Japanese Laid-open Patent Publication No. 2014-232369 may be applied to the library function ACCESS (a). Therefore, the library function ACCESS (a) is not described in detail herein.

A function print_out_RESULT ( ) included in the profile information generation program illustrated in FIG. 10 outputs, as the cache profile information, the number of cache misses determined by the library function ACCESS. The function print_out_RESULT ( ); may be implemented by executing a library function DUMP disclosed in Japanese Laid-open Patent Publication No. 2014-232369, for example.

The program illustrated in FIG. 10 is an example of the cache information generation program for a case where a cache profile information generation process is sequentially executed for each cache set. The cache profile information may be simulated independently for each cache set. By utilizing such properties, all the cache sets may be simulated at the same time, and cache profile information generation processes for the respective cache sets may be executed in parallel with each other. For example, "as =(address/B)%S", which is similar to a formula that identifies the cache set number s discussed above, is added at the beginning of the cache information generation program. Then, the library function ACCESS (a) discussed above may be executed in the case where the value of as coincides with the relevant cache set number (s). Consequently, profile information of each cache set may be generated in parallel, and therefore profile information may be generated at a high speed.

Next, the first conversion processing which is executed in S10 of the information processing illustrated in FIG. 3 will be described with reference to FIG. 12.

First, in S11, the first conversion unit 11 decomposes program information about the input target program into constituent elements. Then, the first conversion unit 11 adds a label to all the assignment statements. In this event, in the case where the data size of the assignment statement is larger than the block size B of the cache memory, the first conversion unit 11 divides the assignment statement into a plurality of statements, and adds a label to each of the plurality of statements.

Next, in S12, the first conversion unit 11 outputs code for acquiring an address value of the entrance (the location in the entire program at which the target program is started) to the input target program. To output a code means describing the relevant code in a source file of the program to be generated.

Next, in S13, the first conversion unit 11 determines whether or not there is any unprocessed constituent element, among the constituent elements into which the program information has been decomposed, that has not been subjected to processes in the following S14 to S19. In the case where there is an unprocessed constituent element, the first conversion unit 11 selects one constituent element S from the unprocessed constituent elements in the order of appearance in the target program. The process proceeds to S14.

In S14, the first conversion unit 11 determines whether or not the constituent element S is a loop. In the case where a positive determination is made, the process proceeds to S15, in which the first conversion unit 11 outputs the constituent element S. The process returns to S13. In the case where a negative determination is made in S14, the process proceeds to S16.

In S16, the first conversion unit 11 determines whether or not the constituent element S is an assignment statement. In the case where a positive determination is made, the process proceeds to S17. In the case where a negative determination is made, the process proceeds to S18.

In S17, the first conversion unit 11 detects a label L added to the assignment statement, and outputs a code for acquiring an address value of the position immediately before the assignment statement. Then, the first conversion unit 11 outputs the assignment statement S. Further, the first conversion unit 11 outputs, after the assignment statement S, a code for acquiring an address value of the position immediately after the assignment statement. The process returns to S13.

In S18, the first conversion unit 11 determines whether or not the constituent element S is a parenthesis that closes a loop. In the case where a positive determination is made, the process proceeds to S19, in which the first conversion unit 11 outputs the constituent element S. Thereafter, the process returns to S13. In the case where a negative determination is made in S18, the process just returns to S13.

In the case where the first conversion unit 11 determines in S13 that the processes in S14 to S19 are finished for all the constituent elements obtained by decomposing the program information of the target program, the process proceeds to S20. In S20, the first conversion unit 11 outputs a code for acquiring an address value of the exit (the location in the entire program at which the target program is ended) from the input target program.

Next, in S21, a code for outputting instruction address information, in which the acquired address values are correlated with the labels, is output. The first conversion processing is ended.

A case where the program information of the target program illustrated in FIG. 4 is converted into an instruction address information acquisition program will be described as an example of the first conversion processing.

Figure 12:
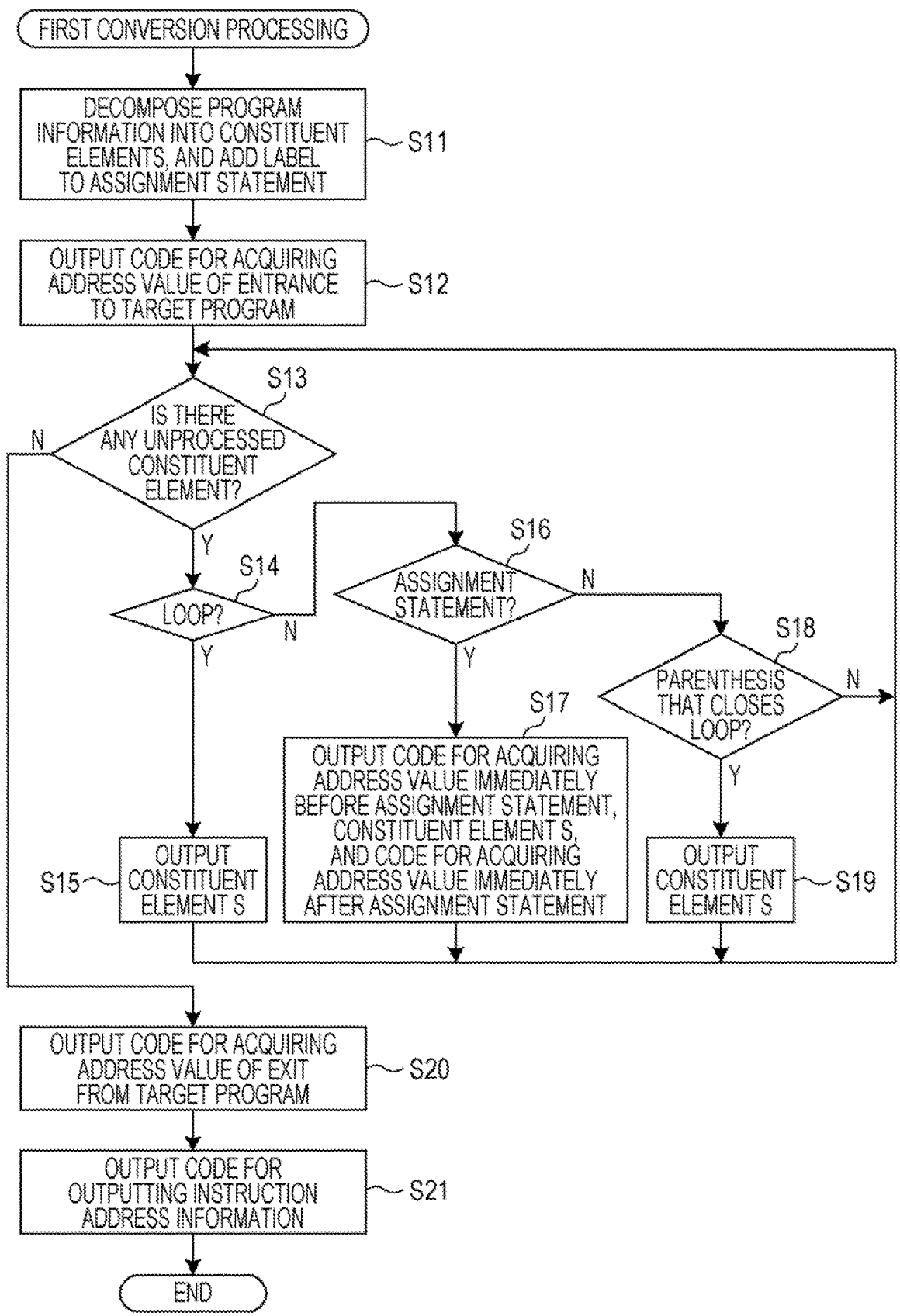
FIG. 12 is a flowchart illustrating an example of first conversion processing.

First, the first conversion unit 11 decomposes the program information into a number of constituent elements E1-E6 as illustrated in FIG. 13 (S11 in FIG. 12). In the example of FIG. 13, a number Ej (j=1, 2, . . . , and 6) is added to each of the constituent elements in the order of appearance of the constituent elements in the program information. In the following description, a constituent element with a number Ej will be represented as a "constituent element Ej".

Then, the first conversion unit 11 adds a label to each of the constituent elements E2 and E4 which are assignment statements (again, S11 in FIG. 12). In FIG. 13, a label "S1" is added to the constituent element E2, and a label "S2" is added to the constituent element E4. In the present embodiment, in order to make the description more easily understandable, the program information of the target program which is illustrated in FIG. 4 is also represented as having a label added thereto.

It is assumed that the following assignment statement is included in the program information, and that the data size of the assignment statement is larger than the block size B of the cache memory.

A[x]=B[x]+B[x+1]+B[x+2]+B[x+3]+B[x+4]+B[x+5]+B[x+6];

In this case, the assignment statement is divided such that the size of each portion after the division is smaller than the block size B, and a label is added to each portion of the divided assignment statement, as indicated below, for example. A variable tmp is a work variable introduced in order to divide the assignment statement.

S1: tmp=B[x]+B[x+1]+B[x+2]+B[x+3];
S2: A[x]=tmp+B[x+4]+B[x+5]+B[x+6];

Next, the first conversion unit 11 outputs the following code, for example, as a code for acquiring an address value of the entrance to the input target program (S12 in FIG. 12).

AS:;

AS is a label that indicates the position of the entrance to the target program.

Next, the first conversion unit 11 selects the constituent element E1 as a target to be processed. Since the constituent element E1 is a loop, the first conversion unit 11 outputs the constituent element E1 (S15 in FIG. 12).

Next, the first conversion unit 11 selects the constituent element E2 as a target to be processed. Since the constituent element E2 is an assignment statement, the first conversion unit 11 first detects the label "S1" of the assignment statement, and outputs a code for acquiring an address value of the position immediately before the assignment statement as indicated below, for example, utilizing the detected label (S17 in FIG. 12).

AS1S:;

Then, the first conversion unit 11 outputs the constituent element E2 itself, and thereafter outputs a code for acquiring an address value of the position immediately after the assignment statement as indicated below, for example (S17 in FIG. 12).

AS1E:;

ALS is a label that indicates the position immediately before the assignment statement to which the label L is added. As described above, when the label L is S1, the label ALS becomes AS1S. ALE is a label that indicates the position immediately after the assignment statement to which the label L is added. As described above, when the label L is S1, the label ALE becomes AS1E.

Next, the first conversion unit 11 selects the constituent element E3 as a target to be processed. Since the constituent element E3 is a loop, the first conversion unit 11 outputs the constituent element E3 (S15 in FIG. 12).

Next, the first conversion unit 11 selects the constituent element E4 as a target to be processed. Since the constituent element E4 is an assignment statement, the first conversion unit 11 first detects the label "S2" of the assignment statement, and outputs a code for acquiring an address value of the position immediately before the assignment statement as indicated below, for example, utilizing the detected label (S17 in FIG. 12).

AS2S:;

Then, the first conversion unit 11 outputs the constituent element E4 itself, and thereafter outputs a code for acquiring an address value of the position immediately after the assignment statement as indicated below, for example (S17 in FIG. 12).

AS2E:;

Next, the first conversion unit 11 selects the constituent element E5 as a target to be processed. Since the constituent element E5 is a parenthesis that closes a loop, the first conversion unit 11 simply outputs the constituent element E5 (S19 in FIG. 12). Since the constituent element E6 is also a parenthesis that closes a loop, the constituent element E6 is processed in the same manner as the constituent element E5.

When all the constituent elements are processed as described above, the first conversion unit 11 outputs the following code, for example, as a code for acquiring an address value of the exit from the input target program (S20 in FIG. 12).

AE:;

AE is a label that indicates the position of the exit from the target program.

Finally, the first conversion unit 11 outputs a code for outputting each of the acquired address values correlated with the respective labels as indicated below, for example (S21 in FIG. 12).

printf ("0x%x\n", &&AS);
printf ("0x%x\n", &&AS1S);
printf ("0x%x\n", &&AS1E);
printf ("0x%x\n", &&AS2S);
printf ("0x%x\n", &&AS2E);
printf ("0x%x\n", &&AE);

In the above example, an operator && for acquiring an address value corresponding to a label, which is included in the extended functions of GNU C compiler, is utilized.

Consequently, the program information which is indicated in FIG. 4 is converted into an instruction address information acquisition program such as that illustrated in FIG. 5.

Next, the second conversion processing which is executed in S40 of the information processing illustrated in FIG. 3 will be described with reference to FIG. 14. Processes of the second conversion processing that are the same as those of the first conversion processing (FIG. 12) discussed above are given the same reference numerals.

First, in S11, the second conversion unit 13 decomposes program information about the input target program into constituent elements. Alternatively, the result (e.g. FIG. 13) of decomposing the program information in S11 of the first conversion processing (FIG. 12) discussed above may be acquired.

Next, in S41, the second conversion unit 13 outputs a code for executing the library function ACCESS which has, as an argument, an address value corresponding to the label AS of the entrance to the input target program. The second conversion unit 13 sets, to the argument, the function iaddress for acquiring the address value corresponding to the label AS of the entrance to the target program from the instruction address information (e.g. FIG. 9) which is acquired by the acquisition unit 12.

Next, in S13, the second conversion unit 13 determines whether or not there is any unprocessed constituent element. In the case where there is an unprocessed constituent element, the second conversion unit 13 selects one constituent element S from the unprocessed constituent elements in the order of appearance in the target program. The process proceeds to S14.

In S14, the second conversion unit 13 determines whether or not the constituent element S is a loop. In the case where a positive determination is made, the process proceeds to S15, in which the second conversion unit 13 outputs the constituent element S. The process returns to S13. In the case where a negative determination is made in S14, the process proceeds to S42.

In S42, the second conversion unit 13 determines whether or not the constituent element S is an assignment statement (indicated as a "first assignment statement" in FIG. 14) that does not affect the number of repetitions of a loop. In the case where a positive determination is made, the process proceeds to S43, in which the second conversion unit 13 deletes the constituent element S. The process proceeds to S46. In the case where a negative determination is made, the process proceeds to S44.

In S44, the second conversion unit 13 determines whether or not the constituent element S is an assignment statement (indicated as a "second assignment statement" in FIG. 14) that affects the number of repetitions of a loop. In the case where a negative determination is made, the process proceeds to S18. In the case where a positive determination is made, the process proceeds to S45, in which the second conversion unit 13 outputs the constituent element S. The process proceeds to S46.

In S46, the second conversion unit 13 detects a label L added to the assignment statement (constituent element S), and outputs a code for executing the library function ACCESS which has, as an argument, an address value corresponding to the label ALS which indicates the position immediately before the assignment statement. Then, the second conversion unit 13 outputs, for each term t included in the assignment statement (constituent element S), a code for executing the library function ACCESS which has, as an argument, an address value of an array element to be referenced by each term t. Further, the second conversion unit 13 outputs a code for executing the library function ACCESS which has, as an argument, an address value corresponding to the label ALE which indicates the position immediately after the assignment statement.

The second conversion unit 13 sets, to the argument of the library function ACCESS for the labels ALS and ALE, the function iaddress for acquiring the address values corresponding to the labels ALS and ALE from the instruction address information (e.g. FIG. 9) which is acquired by the acquisition unit 12. The second conversion unit 13 also sets, to the argument of the library function ACCESS for each term t, the function address for identifying the address values of array elements to be referenced by each term t with reference to the program data information (e.g. FIG. 7). Then, the process returns to S13.

In S18, the second conversion unit 13 determines whether or not the constituent element S is a parenthesis that closes a loop. In the case where a positive determination is made, the process proceeds to S19, in which the second conversion unit 13 outputs the constituent element S. Thereafter, the process returns to S13. In the case where a negative determination is made, the process just returns to S13.

In the case where the second conversion unit 13 determines in S13 that the processes in S14 to S19 are finished for all the constituent elements obtained by decomposing the program information of the target program ("No" at S13), the process proceeds to S47. In S47, the second conversion unit 13 outputs a code for executing the library function ACCESS which has, as an argument, an address value corresponding to the label AE of the exit from the input target program. The second conversion unit 13 sets, to the argument, the function iaddress for acquiring the address value corresponding to the label AE of the exit from the target program, from the instruction address information (e.g. FIG. 9) which is acquired by the acquisition unit 12.

Next, in S48, the second conversion unit 13 outputs code for outputting the cache profile information. Thereafter, the second conversion processing is ended.

A case where the program information of the target program illustrated in FIG. 4 is converted into a profile information generation program will be described as an example of the second conversion processing.

Figure 14:
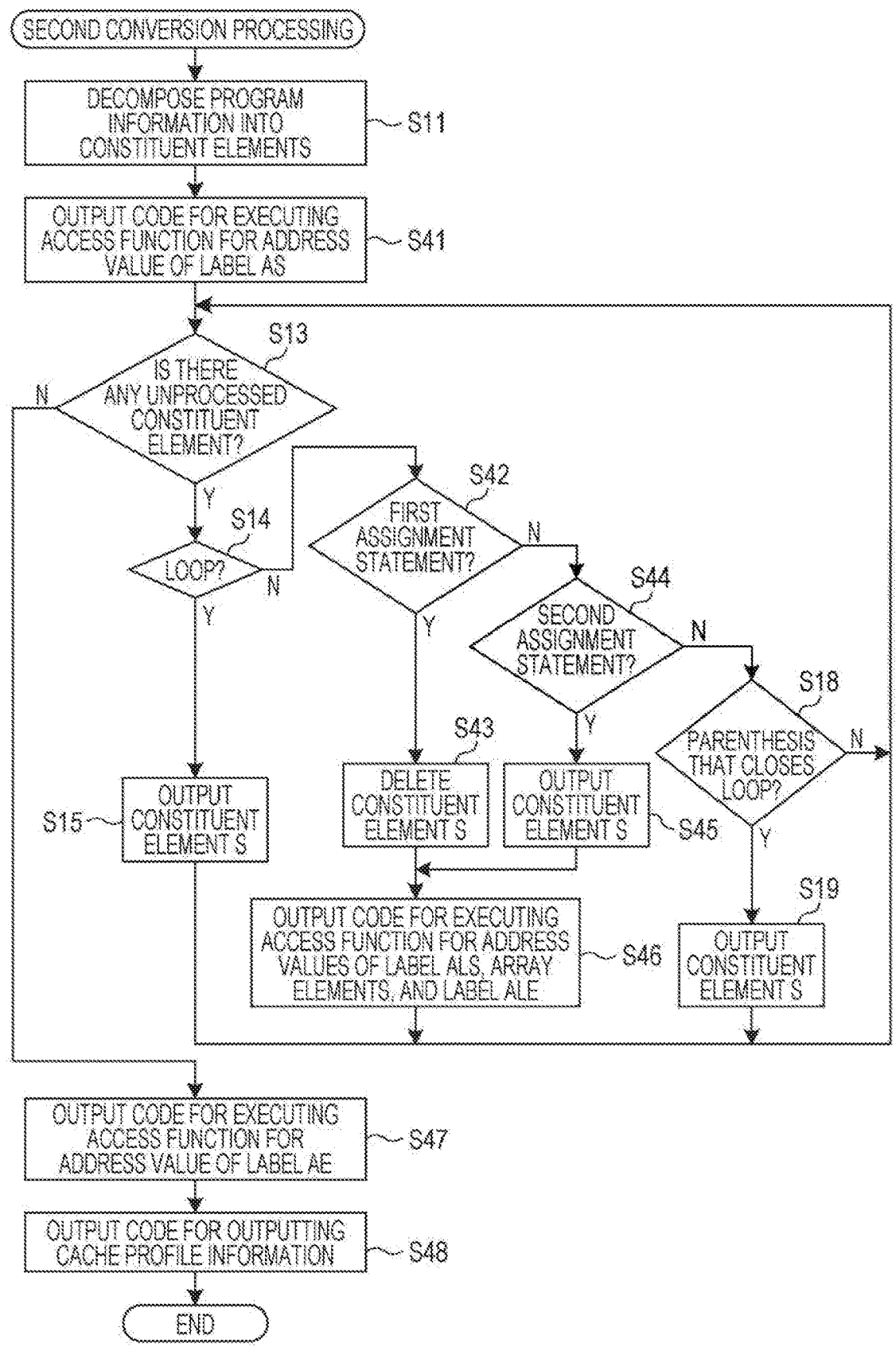
FIG. 14 is a flowchart illustrating an example of second conversion processing.

First, as in the first conversion processing, the second conversion unit 13 decomposes the program information into constituent elements, illustrated in FIG. 13 (S11 in FIG. 14).

Next, the second conversion unit 13 outputs a code for executing the library function ACCESS for the address value of the entrance to the target program as indicated below, for example (S41 in FIG. 14).

ACCESS (iaddress(AS));

Next, the second conversion unit 13 selects the constituent element E1 as a target to be processed. Since the constituent element E1 is a loop, the second conversion unit 13 outputs the constituent element E1 (S15 in FIG. 14).

Next, the second conversion unit 13 selects the constituent element E2 as a target to be processed. Since the constituent element E2 is an assignment statement that affects the number of repetitions of a loop, the second conversion unit 13 first outputs the constituent element E2 itself (S45 in FIG. 14). Then, the second conversion unit 13 detects a label S1 added to the assignment statement (constituent element E2), and outputs a code for executing the library function ACCESS for an address value corresponding to the label AS1S which indicates the position immediately before the assignment statement as indicated below (S46 in FIG. 14).

ACCESS (iaddress(AS1S));

After that, the second conversion unit 13 outputs a code for executing the library function ACCESS for an array element NJ[i] that appears in the assignment statement (constituent element E2) as indicated below (S46 in FIG. 14).

ACCESS (address(NJ[i]));

Then, the second conversion unit 13 outputs a code for executing the library function ACCESS for an address value corresponding to the label AS1E which indicates the position immediately after the assignment statement as indicated below (S46 in FIG. 14).

ACCESS (iaddress(AS1E));

Next, the second conversion unit 13 selects the constituent element E3 as a target to be processed. Since the constituent element E3 is a loop, the second conversion unit 13 outputs the constituent element E3 (S15 in FIG. 14).

Next, the second conversion unit 13 selects the constituent element E4 as a target to be processed. Since the constituent element E4 is an assignment statement that does not affect the number of repetitions of a loop, the second conversion unit 13 deletes the constituent element E4 (S43 in FIG. 14). Then, the second conversion unit 13 detects a label S2 added to the assignment statement (constituent element E4), and outputs code for executing the library function ACCESS for an address value corresponding to the label AS2S which indicates the position immediately before the assignment statement as indicated below, for example (S46 in FIG. 14).

ACCESS (iaddress(AS2S));

After that, the second conversion unit 13 outputs a code for executing the library function ACCESS for each of three array elements, namely X[i][j] and Y[i][j] which appear on the right side of the assignment statement (constituent element E4) and Z[i][j] which appears on the left side of the assignment statement, as indicated below (S46 in FIG. 14).

ACCESS (address(X[i][j]));
ACCESS (address(Y[i][j]));
ACCESS (address(Z[i][j]));

Then, the second conversion unit 13 outputs a code for executing the library function ACCESS for an address value corresponding to the label AS2E which indicates the position immediately after the assignment statement as indicated below, for example (S46 in FIG. 14).

ACCESS (iaddress(AS2E));

Next, the second conversion unit 13 selects the constituent element E5 as a target to be processed. Since the constituent element E5 is a parenthesis that closes a loop, the second conversion unit 13 simply outputs the constituent element E5 (S19 in FIG. 14). Since the constituent element E6 is also a parenthesis that closes a loop, the constituent element E6 is processed in the same manner as the constituent element E5.

When all the constituent elements are processed as described above, the second conversion unit 13 outputs a code for executing the library function ACCESS for an address value of the exit from the input target program as indicated below, for example (S47 in FIG. 14).

ACCESS (iaddress(AE));

Finally, the second conversion unit 13 outputs a code for outputting the cache profile information as indicated below, for example (S48 in FIG. 14).

print_out_RESULT ( );

Consequently, the program information illustrated in FIG. 4 is converted into a profile information generation program such as that illustrated in FIG. 10.

With the information processing apparatus 10 according to the first embodiment, as described above, an address value of a memory to which a program requests to access, when the program executes an instruction at a position corresponding to a label added to an instruction in the program, is acquired, based on the label added to the instruction in the program. Then, the information processing apparatus 10 according to the first embodiment acquires cache profile information by simulating access to a cache set of a cache memory corresponding to the acquired address value. Consequently, the cache profile information may be acquired also for an instruction in the same manner as for other data such as array elements.

The profile information may be acquired at a high speed by performing a simulation in consideration of only memory accesses while omitting calculations performed by the target program.

For example, an HPC application program generally accesses a plurality of huge arrays. Therefore, the time used for memory access takes up a large proportion of the total program execution time, and includes a large amount of floating-point operations in which individual instructions take a long execution time. In the present embodiment, the process may be performed at a high speed because substantially no floating-point operation or memory access is performed.

By simulating cache access, profile information on cache access of the target program may be acquired without using the actual device on which the target program is run.

The cache configuration may be different between during loading of the target program and during the actual operation because of the difference between the environment for the loading and the environment for the actual operation. In the case where profile information is acquired using a register built in a CPU, profile information based on the cache configuration of the CPU may only be acquired. In the present embodiment, appropriate profile information may be acquired by performing simulation using cache configuration information that indicates the cache configuration during the actual operation.

Access to a cache memory may be simulated in parallel for respective cache sets. This also contributes to acquiring profile information at a high speed. For example, the number of cache sets is generally a hundred to several thousands, depending on the CPU. Thus, profile information may be acquired a hundred times to several thousands of times faster than the case where profile information is acquired sequentially for each cache set.

Second Embodiment

Next, a second embodiment will be described. Components of an information processing apparatus according to the second embodiment that are the same as those of the information processing apparatus 10 according to the first embodiment are given the same reference numerals to omit detailed description.

Input information about the target program to be input to an information processing apparatus 210 (FIG. 1) according to the second embodiment includes arrangement attempt information (to be discussed in detail later) in addition to the input information according to the first embodiment. As illustrated in FIG. 1, the information processing apparatus 210 functionally includes a first conversion unit 11, an acquisition unit 12, a second conversion unit 13, and a generation unit 214. The first conversion unit 11 and the acquisition unit 12 are an example of an acquisition unit according to the disclosure. The second conversion unit 13 and the generation unit 214 are an example of a generation unit according to the disclosure.

The generation unit 214 counts the number of cache misses for each of a plurality of pieces of arrangement information in which changes are made to the instruction address information acquired by the acquisition unit 12 and address information (data address information) of program data information which is provided as the input information about the target program. Then, the generation unit 214 generates a piece of arrangement information corresponding to a case where the number of cache misses is the smallest as optimum arrangement information of instructions and data, and outputs the optimum arrangement information.

The information processing apparatus 210 may be implemented by a computer 20 illustrated in FIG. 2, for example. The storage unit 23 of the computer 20 stores an information processing program 230 for causing the computer 20 to function as the information processing apparatus 210. The information processing program 230 has a first conversion process 31, an acquisition process 32, a second conversion process 33, and a generation process 234.

The CPU 21 reads the information processing program 230 from the storage unit 23 to load the information processing program 230 in the memory 22, and sequentially executes the processes of the information processing program 230. The CPU 21 operates as the generation unit 214 illustrated in FIG. 1 by executing the generation process 234. The other processes are the same as those of the information processing program 30 according to the first embodiment. Consequently, the computer 20 which executes the information processing program 230 functions as the information processing apparatus 210.

The functions which are implemented by the information processing program 230 may also be implemented by a semiconductor integrated circuit, more specifically an ASIC or the like, for example.

Next, operations of the information processing apparatus 210 according to the second embodiment will be described. When input information about the target program is input to the information processing apparatus 210 to instruct the information processing apparatus 210 to start the profiling, the information processing apparatus 210 executes the information processing illustrated in FIG. 15. Processes of the information processing according to the second embodiment that are the same as those of the information processing (FIG. 3) according to the first embodiment are given the same reference numerals to omit detailed description.

When S10 to S40 are executed in the same manner as in the first embodiment, the instruction address information illustrated in FIG. 9 and the profile information generation program illustrated in FIG. 10 are obtained, for example.

Next, in S50, the generation unit 214 converts the instruction address information which is acquired in S30 into instruction address information for optimization, in which the address values corresponding to labels are each converted into an expression of an offset value from the address value corresponding to the leading label. In the present embodiment, the leading label is a label corresponding to the smallest address value, that is, the label AS which indicates the entrance to the target program in the entire program. Thus, the generation unit 214 converts the instruction address information into instruction address information for optimization, by calculating the difference between the address value corresponding to the label AS and the address value corresponding to each of the labels as an offset value corresponding to the label. FIG. 16 illustrates the instruction address information for optimization which is obtained by converting the instruction address information illustrated in FIG. 9.

Next, in S55, the generation unit 214 converts the profile information generation program which is obtained by performing conversion in S40 into a profile information generation program for optimization.

Specifically, the generation unit 214 converts the argument of the library function ACCESS for acquiring cache profile information of instructions as follows.

Before conversion: ACCESS (iaddress(I));
After conversion: ACCESS (ASTART+ioffset(I));

ASTART is an address value corresponding to the leading label. The value of ioffset(I) is an offset value corresponding to a label I of the instruction address information for optimization, which is obtained by performing conversion in S50.

The generation unit 214 converts the argument of the library function ACCESS for acquiring cache profile information of array elements as follows.

Before conversion: ACCESS (address(D));
After conversion: ACCESS (DSTART(X)+offset(X));

DSTART(X) is an address value of the leading element of an array X. The value of offset(X) may be calculated during execution of the profile information generation program for optimization, by subtracting the address value of the leading element of the array X from the address value of an element D of the array X. For example, offset(X[i][j]) may be calculated as &(X[i][j])-&(X[0][0]).

FIG. 17 illustrates the profile information generation program for optimization, which is obtained by converting the profile information generation program illustrated in FIG. 10.

Figure 15:
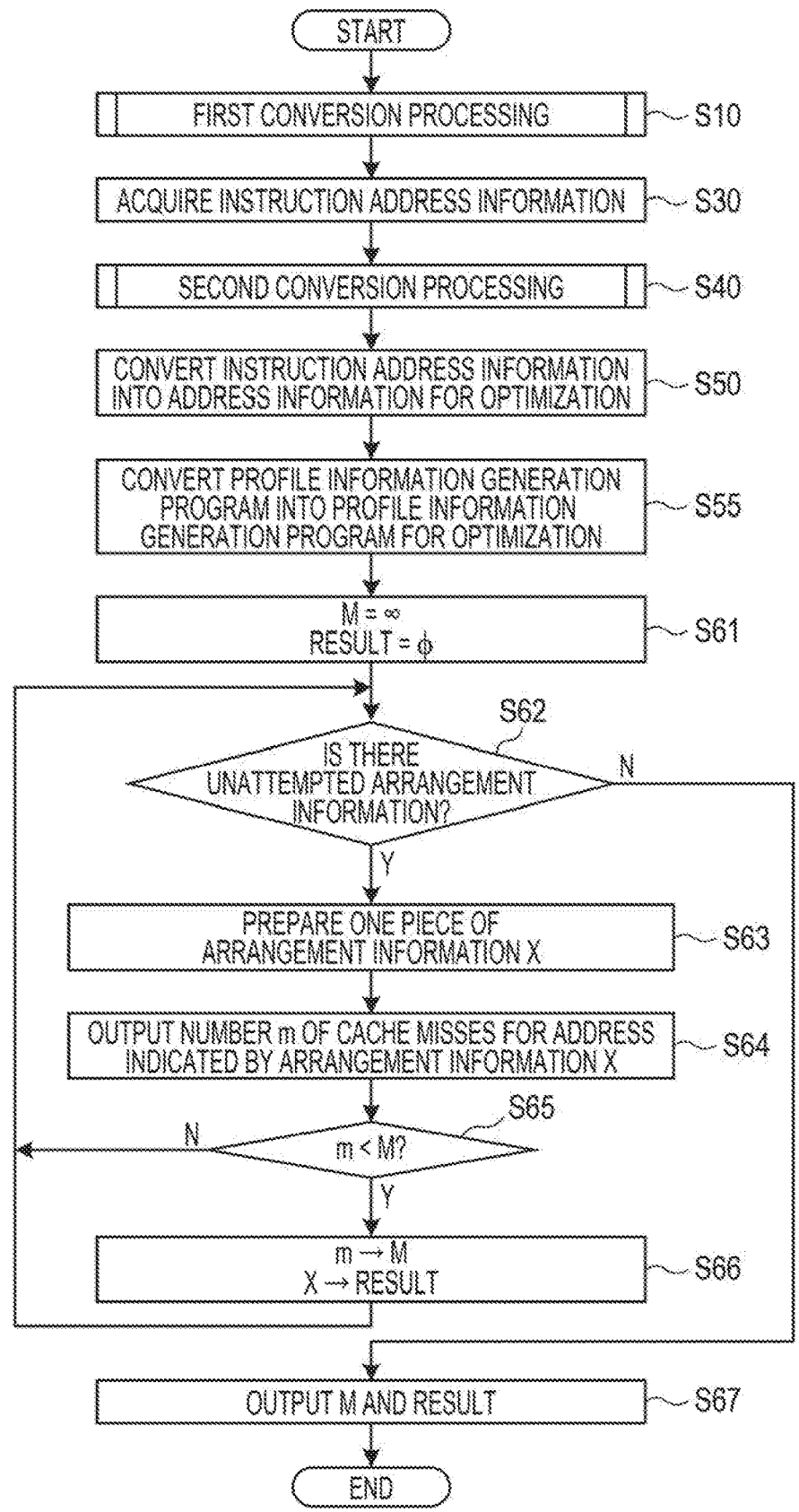
FIG. 15 is a flowchart illustrating an example of information processing when information about a target program is input to the information processing apparatus to start cache profiling, according to a second embodiment.

Next, in S61 of FIG. 15, the generation unit 214 initializes a work variable M, which represents the smallest value of the number of cache misses, to M=∞, and initializes a work variable RESULT, which represents optimum arrangement information which minimizes the number of cache misses, to null.

Next, in S62, the generation unit 214 determines whether or not there is any unattempted arrangement information, for which the processes in S64 to S66 described below have not been attempted yet, in the arrangement information which is prepared from the arrangement attempt information which is included in the input information. In the case where there is any such unattempted arrangement information, the process proceeds to S63.

The arrangement attempt information defines a "start address value" of instructions and data identified by a "data name", and a "change offset range" which indicates a value range in which the start address value of data is changed, as illustrated in FIG. 18, for example. "ASTART" in the "data name" represents an instruction corresponding to the leading label. In the case where the "data name" indicates an array, the "start address value" defines the start address value of the leading array element.

In the example of FIG. 18, the change offset range is a range of 0 to 256 bytes for the leading label and all the data. Each of combinations of offset values in multiples of a predetermined number of bytes in the change offset range for the leading label and each of the data is used as a piece of arrangement information. For example, in the case where the predetermined number of bytes is eight bytes, the offset values for the leading label and each of the data may be selected from 33 patterns including 0, 8, . . . , and 256. In the example of FIG. 18, there are five kinds of data, and therefore $33^5$ patterns of arrangement information may be prepared. The predetermined number of bytes may be set, as appropriate, in accordance with the cache configuration information, the sizes of the block and the line of the cache memory, the size of the array, the data size of the elements, etc.

In S63, the generation unit 214 prepares one piece of unattempted arrangement information X, such as that illustrated in FIG. 19, with reference to the arrangement attempt information. The arrangement information X in FIG. 19 indicates that the start address value is increased by 128 bytes for the array Z to achieve DSTART(Z)=0x3000+128=0x3080.

The information indicates that, for the other data and the leading label, the start address value which is defined in the arrangement attempt information is used as it is.

Next, in S64, the generation unit 214 executes the profile information generation program for optimization, by using the program data information, the array data information, the variable data information, the cache configuration information, the instruction address information for optimization, the arrangement attempt information, and the arrangement information X. In this event, an address value obtained by adding an offset value indicated in the arrangement information X which is prepared in S63 to the "start address value" in the arrangement attempt information is referenced for each of ASTART and DSTART(D) of the profile information generation program for optimization. The generation unit 214 outputs a number m of cache misses as the result of execution of the profile information generation program for optimization.

Next, in S65, the generation unit 214 determines whether or not the number m of cache misses which is output in S64 is less than the work variable M. In the case where m is less than M, the process proceeds to S66, in which the generation unit 214 stores the value of m in M, and stores the arrangement information X which is prepared in S63 in the work variable RESULT. The process returns to S62. In the case where m is not less than M, S66 is skipped, and the process returns to S62.

In the case where it is determined in S62 that an attempt has been made for all the pieces of arrangement information, the process proceeds to S67. In S67, the generation unit 214 outputs the smallest number of cache misses stored in M and the arrangement information X stored in RESULT as cache profile information of the target program. Thereafter, the information processing is ended.

With the information processing apparatus 210 according to the second embodiment, as described above, the number of cache misses is acquired as the cache profile information for each of a plurality of pieces of arrangement information in which changes are made to the arrangement of instructions and data. Then, a piece of arrangement information in which the number of cache misses is the smallest is output as optimum arrangement information of instructions and data. Consequently, the information processing apparatus 210 according to the second embodiment may acquire optimum arrangement information of instructions and data that may improve the cache utilization efficiency without human trial and error, in addition to achieving the effect of the first embodiment.

The above embodiments have been described on the premise of the von Neumann architecture in which instructions and data are stored in the same cache. However, the embodiments are not limited thereto. Embodiments with the von Neumann architecture may be partially modified to be applied to the Harvard architecture in which instructions and data are stored in different caches.

For example, an architecture in which an instruction cache L1I and a data cache L1D are present in level 1 and a unified cache is present in level 2 is considered. In this case, three pieces of cache configuration information for L1I, L1D, and L2, such as that illustrated in FIG. 11, are prepared. Then, the library function ACCESS which references the instruction address information is changed to a library function IACCESS. That is, the library function ACCESS simulates access to the data cache L1D, and the library function IACCESS simulates access to the instruction cache L1I.

The cache L2 is connected downstream of the caches L1I and L1D to acquire cache profile information through simulation of a multi-level cache described in Japanese Laid-open Patent Publication No. 2014-232369, for example. FIG. 20 illustrates an example in which the program information of the target program illustrated in FIG. 4 is converted into a profile information generation program in correspondence with the Harvard architecture.

In the embodiments described above, the number of cache misses which is acquired by the library function ACCESS is output as the cache profile information. However, the embodiments are not limited thereto. For example, it is also possible to output information that indicates an instruction or data, an access to which has caused a cache miss. For example, information that indicates a line number in the target program may be added, as in ACCESS (line x) (address).

This information indicates that the library function ACCESS outputs cache profile information of an instruction or data on that line. In this case, the number of cache misses for each line, that is, for each instruction or data, may be output as the cache profile information, as in line x: m times.

In the embodiments described above, cache profile information of both instructions and data is acquired. However, cache profile information of only instructions may be acquired.

In the above description, the information processing programs 30 and 230 are stored (installed) in the storage unit 23 in advance. However, the embodiments are not limited thereto. The program may be provided as stored in a storage medium such as a compact disc read-only memory (CD-ROM), a digital versatile disc read-only memory (DVD-ROM), a universal serial bus (USB) memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus, comprising:
a first memory; and
a processor coupled to the first memory, the processor configured to:
convert program information of a target program into a source file of an instruction address information acquisition program;
execute the instruction address information acquisition program;
acquire a first address in the first memory, at which an instruction included in the target program is stored;
convert the program information of the target program into a source file of a profile information generation program;
execute the profile information generation program;
simulate access to a second memory of the processor, the simulated access to the second memory corresponding to an access request for access to the first address on a basis of configuration information of the second memory; and
generate cache profile information indicating whether the access to the second memory regarding the instruction is a hit or miss.

2. The information processing apparatus according to claim 1, wherein the processor is configured to:
add additional information to the target program at a position of the instruction; and
acquire an address corresponding to the additional information as the first address.

3. The information processing apparatus according to claim 1, wherein the processor is configured to:
acquire a number of cache misses for each of a plurality of pieces of arrangement information in which changes are made to the first address and an address of data utilized by the target program; and
select a piece of arrangement information corresponding to a case where the number of cache misses is smallest.

4. The information processing apparatus according to claim 1, wherein the processor is configured to generate, in a case where the second memory is divided into a plurality of cache sets, the cache profile information for each of the cache sets.

5. The information processing apparatus according to claim 4, wherein the processor is configured to execute processes of generating the cache profile information for the respective cache sets in parallel with each other.

6. The information processing apparatus according to claim 4, wherein the processor is configured to:
identify a cache set number of the second memory corresponding to a first access request for access to the first memory;
simulate the access to the second memory to determine whether a cache set indicated by the cache set number includes a first instruction corresponding to the first access request; and
generate the cache profile information indicating whether the access to the second memory regarding the first instruction is a hit or miss.

7. An information processing method executed by a computer, comprising:
converting program information of a target program into a source file of an instruction address information acquisition program;
executing the instruction address information acquisition program;
acquiring a first address in a first memory, at which an instruction included in the target program is stored;
converting the program information of the target program into a source file of a profile information generation program;
executing the profile information generation program;
simulating access to a second memory of the computer, the simulated access to the second memory corresponding to an access request for access to the first address on a basis of configuration information of the second memory; and generating cache profile information indicating whether the access to the second memory regarding the instruction is a hit or miss.

8. The information processing method according to claim 7, further comprising:
adding additional information to the target program at a position of the instruction; and
acquiring an address corresponding to the additional information as the first address.

9. The information processing method according to claim 7, further comprising:
acquiring a number of cache misses for each of a plurality of pieces of arrangement information in which changes are made to the first address and an address of data utilized by the target program; and
selecting a piece of arrangement information corresponding to a case where the number of cache misses is smallest.

10. The information processing method according to claim 7, further comprising generating, in a case where the second memory is divided into a plurality of cache sets, the cache profile information for each of the cache sets.

11. The information processing method according to claim 10, further comprising executing processes of generating the cache profile information for the respective cache sets in parallel with each other.

12. The information processing method according to claim 10, further comprising:
identifying a cache set number of the second memory corresponding to a first access request for access to the first memory;
simulating the access to the second memory to determine whether a cache set indicated by the cache set number includes a first instruction corresponding to the first access request; and
generating the cache profile information indicating whether the access to the second memory regarding the first instruction is a hit or miss.

13. A non-transitory computer-readable recording medium having stored therein a program that causes a computer to execute a process, the process comprising:
converting program information of a target program into a source file of an instruction address information acquisition program;
executing the instruction address information acquisition program;
acquiring a first address in a first memory, at which an instruction included in the target program is stored;
converting the program information of the target program into a source file of a profile information generation program;
executing the profile information generation program;
simulating access to a second memory of the computer, the simulated access to the second memory corresponding to an access request for access to the first address on a basis of configuration information of the second memory; and
generating cache profile information indicating whether the access to the second memory regarding the instruction is a hit or miss.

14. The non-transitory computer-readable recording medium according to claim 13, the process further comprising:
adding additional information to the target program at a position of the instruction; and
acquiring an address corresponding to the additional information as the first address.

15. The non-transitory computer-readable recording medium according to claim 13, the process further comprising:
acquiring a number of cache misses for each of a plurality of pieces of arrangement information in which changes are made to the first address and an address of data utilized by the target program; and
selecting a piece of arrangement information corresponding to a case where the number of cache misses is smallest.

16. The non-transitory computer-readable recording medium according to claim 13, the process further comprising generating, in a case where the second memory is divided into a plurality of cache sets, the cache profile information for each of the cache sets.

17. The non-transitory computer-readable recording medium according to claim 16, the process further comprising executing processes of generating the cache profile information for the respective cache sets in parallel with each other.

18. The non-transitory computer-readable recording medium according to claim 16, the process further comprising:
identifying a cache set number of the second memory corresponding to a first access request for access to the first memory;
simulating the access to the second memory to determine whether a cache set indicated by the cache set number includes first instruction corresponding to the first access request; and
generating the cache profile information indicating whether the access to the second memory regarding the first instruction is a hit or miss.

* * * * *